United States Patent Office 3,197,420
Patented July 27, 1965

3,197,420
PROCESS FOR POLYMERIZING 1,3,6-TRIOXA-CYCLO-OCTANES
Klaus Weissermel, Frankfurt am Main, and Manfred Reiher, Hofheim, Taunus, Germany, assignors to Farbwerke Hoechst Aktiengesellschaft vormals Meister Lucius & Brüning, Frankfurt am Main, Germany, a corporation of Germany
No Drawing. Filed July 29, 1960, Ser. No. 46,090
Claims priority, application Germany, Aug. 7, 1959, F 29,123
19 Claims. (Cl. 260—2)

The present invention relates to a process for polymerizing 1,3,6-trioxa-cycloalkanes, and more especially to a process for polymerizing 1,3,6-trioxa-cyclo-octane which is a compound having the following formula:

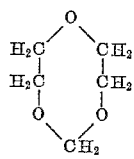

It is known that 1,3,6-trioxa-cyclo-octane can be polymerized in the presence of an acid catalyst, for example in the presence of 0.5–2% sulfuric acid, para-toluene-sulfonic acid or in the presence of boron fluoride, aluminum chloride or ferric chloride, whereby a slowly crystallizing wax is obtained, which is completely soluble in water and all customary organic solvents and melts at temperatures in the neighborhood of 30° C.

The present invention relates to a process for making rubber-elastic, thermoplastic polymers of high molecular weight, wherein 1,3,6-trioxa-cyclo-octane is polymerized in the presence of an organo-aluminum compound and a halogen-containing organic compound, advantageously in the presence of a halogen-containing ether.

Appropriate organo-aluminum compounds which in combination with organic halogen compounds initiate the polymerization of trioxa-cyclo-alkanes, preferably 1,3,6-trioxa-cyclo-octane, are those compounds which correspond to the following general formula:

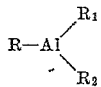

wherein R represents a halogen atom or a hydrogen atom or an alkyl group, $R_1$ represents an alkyl group, $R_2$ represents an alkyl group, the alkyl groups containing from 1 to 6 carbon atoms and the halogen atom being advantageously a chlorine atom.

The following organo-aluminum compounds may be mentioned more especially: trimethyl-aluminum, triethyl-aluminum, triisobutyl-aluminum, di-isobutyl-aluminum hydride, dimethyl aluminum chloride or diethyl-aluminum chloride.

The aforesaid organo-aluminum compounds alone are not capable of initiating the polymerization of 1,3,6-trioxa-cyclo-octane under the reaction conditions selected; only upon the addition of an organic halogen compound as specified below become those organic aluminum compounds active catalysts.

As halogen-containing compounds which in combination with the organo-metal compounds specified above yield catalysts very active in the polymerization of trioxa-cyclo-alkanes, there may be mentioned more especially organic halogen compounds, advantageously ethers which preferably contain fluorine and/or chlorine and in which the mobility of the halogen atom is less than that of α-mono-chloro-dialkyl-ethers. The term "mobility of the halogen atom" as used herein is intended to mean the rate with which the halogen atom undergoes solvolysis in an organic solvent, for example alcohol.

The following compounds may be mentioned by way of example:

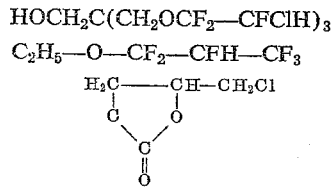

All compounds specified above have the characteristic feature to contain at least 1 halogen atom, preferably fluorine or chlorine, in the molecule. In combination with the organo-aluminum compound or in combination with the organo-aluminum compounds they yield the active catalyst. Alternatively, several halogen-containing organic compounds may be used together with organo-aluminum compounds.

1,3,6-trioxa-cyclo-alkanes, advantageously 1,3,6-trioxa-cyclo-octane can very rapidly be converted with the aid of those catalyst combinations into high molecular, tough, rubber-elastic polymers. These polymers have a substantially higher molecular weight than those products which are obtained with the use of a known Friedel-Crafts catalyst. In addition thereto, it is in some cases superfluous to completely remove catalyst residues from the polymer, while those residues have to be substantially removed from the polymer when a strong Lewis acid, for example boron trifluoride, is used.

Depending on the polymerization conditions used, the proportion in which to use the halogen-containing organic components in order to initiate ionic polymerization may vary within relatively wide limits. Those components are generally used in a concentration within the range of between 0.01 and 10% by weight, preferably between 0.1 and 8% by weight, calculated on the weight of monomer used.

The organo-aluminum compound is used in a concentration within the range of between 0.01 and 3%, preferably 0.1 and 1.5% by weight, calculated on the weight of monomer used.

The polymerization proceeds probably by an ion chain mechanism and leads to a polymer corresponding to the following general formula:

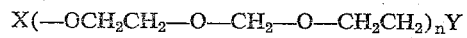

wherein X and Y represent the terminal groups of the macromolecule. These groups are naturally determined by the catalyst system and the reaction conditions selected in a given case. $n$ is generally greater than 100.

Aliphatic, cycloaliphatic, aromatic and halogenated hydrocarbons may be used as solvents for polymerizing trioxa-cyclo-alkanes according to this invention, for example n-pentane, n-hexane, n-octane, methylene chloride, cyclohexane, methylcyclohexane, chloroform, carbon tetrachloride, trichloro ethylene, tetrachloro ethylene. When hydrocarbons are used, the polymer precipitates during polymerization, whereas it remains completely dissolved in halogenated hydrocarbons. In many cases, the polymerization is carried out in the absence of a solvent in order to obtain a high yield. In this case, a polymer block which may include many small gas bubbles, is obtained after the polymerization is complete.

The temperature at which polymerization is carried out may vary within wide limits. It is, however, advantageous to work at a temperature between 0° C. and 60° C.

The polymerization rate increases as does the temperature under otherwise identical reaction conditions. Polymerization sets generally in after a few seconds or minutes and is complete within a short time, especially when a temperature above 25° C. is used. In most cases, the yields are above 90%.

The polymerization is carried out in the absence of moisture and oxygen. 1,3,6-trioxa-cyclo-octane may be distilled over alminum triethyl, for example, in order to purify the product and obtain it in absolute form.

The block polymers obtained are worked up by dissolving them, for example in acetone, methyl acetate or methylene chloride and then precipitating the polymer with petroleum ether or pentane. During the work up, the polymers may be admixed with substances that prevent oxidative degradation. The polymers are very reluctantly soluble in most polar organic solvents, the dissolution being accompanied by a strong viscosity increase of the solvent. The solution so prepared can be used, after removal of catalyst constituents, for making colorless, transparent cast films.

The poly-trioxa-cyclo-octanes of high molecular weight which are obtained by the process described in this invention constitute formaldehyde-ethylene oxide copolymers.

Those polymers may also be admixed with certain substances, for example, phenols, aromatic amines or carboxylic acid amides, which influence the properties of the final products or have a stabilizing and/or plasticizing effect or serve to incorporate specific terminal groups into the polymer. The polymers obtained by the process of this invention may also be cross-linked with reactive polyfunctional organic compounds, for example polyisocyanates.

The products obtained have thermoplastic properties and are of rubber-like nature. They can, therefore, be used in many fields of application. They may be used, for example, for making films and sheets or compound glass. Still further, they may be used as textile auxiliary agents, processing auxiliary agents and plastifying agents. Those thermoplastic and rubber-elastic polymers of 1,3,6-trioxa-cyclo-octane which have a reduced viscosity of above 2.5 constitute especially valuable products.

The following examples serve to illustrate the invention, but they are not intended to limit it thereto, the parts being by weight unless otherwise stated, and the reduced viscosity being stated in terms of the equation:

$$\text{Reduced Viscosity} = \frac{(\Delta \eta)}{\eta_0} \cdot \frac{1}{C}$$

in which $\Delta \eta$ is the difference between the viscosity of a solution of the polymer and the viscosity of the solvent, $\eta_0$ is the viscosity of the solvent, and C is the concentration (0.1%) of the polymer in the solvent.

Example 1

336 parts 1,3,6-trioxa-cyclo-octane and 30 parts 4-chloro-methyl-1,3,-dioxolone were cautiously combined at 40° C. with the exclusion of moisture and air with 1.9 parts aluminum triethyl. Polymerization set in at once and the batch solidified within a short time to a solid, viscous mass. The rubber-elastic bulk polymer obtained was substantially dissolved in a large amount of acetone containing 1% ethanol amine and then precipitated at −60° C. with petroleum ether. The polymer was filtered off with suction, after-washed with petroleum ether and dried in vacuo at 50° C. A rubber-elastic polymer was obtained in a yield of 320 parts. Its reduced viscosity was 2.87 determined at 25° C. in benzene.

*Analysis.*—Found: C, 49.8%; H, 8.5%; Cl, 0.3%.

The polymer obtained was cut into square pieces and heated for 30 minutes on a Kofler heater. The pieces retained their shape up to a temperature of 120° C., then became thickly liquid at 170° C. and finally thinly liquid at 190° C. At that temperature, evolution of gas and slight discoloration were sometimes observed.

The polymer so obtained was made into a sheet 1 mm. thick in the manner described below:

| | |
|---|---:|
| 2 minute pre-heating °C | 80 |
| 2 minute pressing kg./cm.$^2$ | 150 |
| cooling under pressure. | |

The sheet so obtained had the following characteristic data:

| | |
|---|---:|
| Tensile strength in kg./cm.$^2$ | 90 |
| Tensile elongation in percent | 32 |
| Ultimate tensile strength in kg./cm.$^2$ | 236 |
| Elongation at break in percent | 528 |
| Ball pressure hardness 10 seconds kg./cm.$^2$ | 212 |
| Ball pressure hardness 60 seconds kg./cm.$^2$ | 207 |
| Shore hardness D | 48 |
| Tension E-modulus | 2,195 |
| Density | 1.221 |

Example 2

28 parts of 1,3,6-trioxa-cyclo-octane and 2.5 parts 4-chloro-methyl-1,3-dioxolone-2 were combined at 20° C. with 0.15 part aluminum triethyl. Polymerization accompanied by an increase in viscosity set in after a few minutes. In the course of the polymerizaton, the monomer was converted into a high molecular, viscous polymer. It was dissolved in methyl acetate containing 1% ethanolamine, precipitated in petroleum ether at −80° C., filtered off with suction and dried. The yield was 24 parts. The polymer had a reduced viscosity of 4.35 (determined in benzene at 25° C.). The density, determined with a sheet, was 1.220.

Example 3

28 parts 1,3,6-trioxa-cyclo-octane and 3 parts $$C_2H_5OCF_2CFH-CF_3$$

were combined at 0° C. with 0.24 part aluminum triethyl. In the course of 4 hours, the batch had solidified to a solid, tough and rubber-elastic block, which was worked up in the manner described in Example 1. The yield was 23 parts. The polymer obtained had a reduced viscosity of 1.75 (determined in benzene at 25° C.). The density, determined with a sheet was 1.230.

Example 4

3 parts 1,3,6-trioxa-cyclo-octane and 0.3 part $$HOCH_2-C-(CH_2OCF_2-CFClH)_3$$

were combined at 25° C. with 0.035 part aluminum triethyl. After 24 hours the polymer obtained was worked up in the usual manner. 2.6 parts of a viscous polymer were obtained. The polymer retained its shape when heated on a Kofler heater at 110° C.

Example 5

3 parts 1,3,6-trioxa-cyclo-octane and 0.2 part 4-chloro-methyl-1,3-dioxolone-2 were combined at 40° C. with 0.03 part diethyl aluminum chloride. In the course of polymerization, the batch solidified to a solid block which was worked up in the manner described in Example 1. The yield was 2.3 parts.

Example 6

3 parts 1,3,6-trioxa-cyclo-octane and 0.3 part $$C_2H_5OCF_2CFHCF_3$$

were dissolved at room temperature in 3 parts methylene chloride and combined with 0.1 part di-iso-butyl-aluminum hydride. Polymerization set in reluctantly. In the course of several hours, the batch became increasingly viscous so that stirring had to be interrupted. The polymer remained dissolved in methylene chloride. After 24 hours, a further amount methylene chloride containing 1% ethanol amine was added, the batch was dissolved by heating, and the polymer formed was precipitated. The yield was 1.7 parts.

In comparative tests, 1,3,6-trioxa-cyclo-octane was polymerized with boron trifluoride-tetrahydrofuran-etherate under the following conditions:

28 parts 1,3,6-trioxa-cyclo-octane were mixed at 40° C. with 0.015 part boron trifluoride tetrahydrofuran-etherate. Polymerization set in at once. A highly viscous oil which solidified slowly to a solid, crystalline wax was obtained. The polymer so obtained was worked up in the manner described in Example 1. The polymer was very readily soluble in most organic solvents and water contrary to those polymers which were obtained in Examples 1–5 and melted at a temperature of about 30–35° C.

The polymer obtained had a reduced viscosity of 0.09 determined in benzene at 25° C.

We claim:

1. A process which comprises polymerizing a 1,3,6-trioxa-cyclo-octane in the presence of a catalyst system comprising (1) an organo aluminum compound having the formula

wherein R represents a member of the group consisting of halogen, hydrogen and alkyl of one to six carbon atoms and $R_1$ and $R_2$ represent alkyls of one to six carbon atoms, and (2) an organic halogen compound selected from the group consisting of 4-chloromethyl-1,3-dioxolone and a halogen-containing ether in which the mobility of the halogen atom is less than that of the chlorine atoms in α-monochloro-dialkyl ethers.

2. The process of claim 1, wherein polymerization is carried out in an organic, inert solvent selected from the group consisting of aliphatic hydrocarbons, cyclo-aliphatic hydrocarbons, chlorinated aliphatic hydrocarbons, and mixtures thereof.

3. The process of claim 1, wherein 1,3,6-trioxa-cyclo-octane is polymerized.

4. The process of claim 1, wherein the organo-aluminum compound is used in a concentration of between 0.01% by weight and 3% by weight, calculated on the weight of monomer used.

5. The process of claim 1, wherein the organo-aluminum compound is used in a concentration of between 0.1% by weight and 1.5% by weight, calculated on the weight of monomer used.

6. The process of claim 1, wherein the organic halogen compound is a halogenated ether.

7. The process of claim 1, wherein the organic halogen compound is 4-chloromethyl-1,3-dioxolone.

8. The process of claim 1, wherein the organic halogen compound is used in a proportion of between 0.1 and 8% by weight, calculated on the monomer used.

9. The process of claim 6, wherein the halogen is chlorine.

10. The process of claim 1, wherein the organic halogen compound is $HOCH_2C(CH_2OCF_2-CFClH)_3$.

11. The process of claim 1, wherein the organic halogen compound is $C_2H_5-O-CF_2-CFH-CF_3$.

12. The process of claim 1, wherein the organic halogen compound is

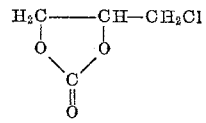

13. The process of claim 1, wherein the organo aluminum compound is dimethyl aluminum chloride.

14. The process of claim 1, wherein the organo aluminum compound is diethyl aluminum chloride.

15. The process of claim 1, wherein the organo aluminum compound is dimethyl aluminum.

16. The process of claim 1, wherein the organo aluminum compound is triethyl aluminum.

17. The process of claim 1, wherein the organo aluminum compound is tri-iso-butyl aluminum.

18. Thermoplastic, rubber-elastic homopolymer of a 1,3,6-trioxa-cyclo-octane having a reduced viscosity greater than 2.5, determined in benzene at 25° C.

19. A homopolymer of 1,3,6-trioxa-cyclooctane, having a reduced viscosity greater than 2.5, determined in benzene at 25° C.

References Cited by the Examiner

FOREIGN PATENTS 741,702 12/55 Great Britain.
1,134,833 9/62 Germany.

OTHER REFERENCES

Industrial and Engineering Chemistry, vol. 46, pp. 790–1 (1954).

MURRAY TILLMAN, *Primary Examiner.*

MILTON STERMAN, HAROLD N. BURSTEIN,
*Examiners.*